(12) United States Patent
Gupta et al.

(10) Patent No.: US 11,861,357 B2
(45) Date of Patent: *Jan. 2, 2024

(54) SELECTING AND SENDING SUBSET OF COMPONENTS TO COMPUTING DEVICE PRIOR TO OPERATING SYSTEM INSTALL

(71) Applicant: Hewlett Packard Enterprise Development LP, Houston, TX (US)

(72) Inventors: Naveen Gupta, Houston, TX (US); Kevin J. Brusky, Houston, TX (US); Srikanth Bemineni, Houston, TX (US); Barbara Craig, Houston, TX (US); Christina Rogers, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,504

(22) Filed: Apr. 15, 2022

(65) Prior Publication Data
US 2022/0244942 A1     Aug. 4, 2022

Related U.S. Application Data

(63) Continuation of application No. 16/392,310, filed on Apr. 23, 2019, now Pat. No. 11,334,337.

(51) Int. Cl.
*G06F 8/65* (2018.01)
*G06F 8/61* (2018.01)
(Continued)

(52) U.S. Cl.
CPC ............... *G06F 8/65* (2013.01); *G06F 8/61* (2013.01); *G06F 9/45558* (2013.01); *G06F 9/54* (2013.01);
(Continued)

(58) Field of Classification Search
CPC .......... G06F 8/65; G06F 8/61; G06F 9/45558; G06F 9/54; G06F 2009/45595; G06F 2009/45579
See application file for complete search history.

(56) References Cited

U.S. PATENT DOCUMENTS 7,237,238 B2    6/2007  Peppers et al.
9,081,747 B1    7/2015  Tabieros et al.
(Continued)

OTHER PUBLICATIONS

A. Czechowski et al., "Microsoft Create Prestaged Media with System Center Configuration Manager," Nov. 4, 2017, pp. 1-6 (online), Retrieved from the Internet on Mar. 14, 2019 at URL: <docs.microsoft.com/en-us/sccm/osd/deploy-use/create-prestaged-media>.

(Continued)

*Primary Examiner* — Daxin Wu
(74) *Attorney, Agent, or Firm* — Trop, Pruner & Hu, P.C.

(57) ABSTRACT

Examples disclosed herein relate to providing a subset of software components customized for a device to the device prior to the device installing an associated operating system. An update platform including a repository including a number of software components associated with multiple operating systems and multiple hardware sets is to determine that an operating system install is to occur on the device. The update platform is to select a subset of the software components for the device based on the operating system install and hardware devices on the device. The update platform is to push the subset to a storage coupled to a baseboard management controller of the device prior to the operating system install.

20 Claims, 4 Drawing Sheets

(51) Int. Cl.
  *G06F 9/455*   (2018.01)
  *G06F 9/54*    (2006.01)
(52) U.S. Cl.
  CPC .............. *G06F 2009/45579* (2013.01); *G06F 2009/45595* (2013.01)

(56) References Cited

U.S. PATENT DOCUMENTS

| | | | |
|---|---|---|---|
| 11,080,041 B1* | 8/2021 | Ah Kun | G06F 9/44505 |
| 2008/0028390 A1 | 1/2008 | Fors et al. | |
| 2008/0092134 A1 | 4/2008 | Zhang et al. | |
| 2008/0098094 A1* | 4/2008 | Finkelstein | G06F 9/4411 |
| | | | 709/221 |
| 2008/0189698 A1* | 8/2008 | Sareen | G06F 9/44505 |
| | | | 717/174 |
| 2009/0055665 A1* | 2/2009 | Maglione | G06F 1/206 |
| | | | 713/320 |
| 2014/0359596 A1* | 12/2014 | Cohen | G06F 8/65 |
| | | | 717/173 |
| 2017/0039060 A1* | 2/2017 | Brusky | G06F 9/06 |
| 2017/0085413 A1* | 3/2017 | Cencini | G06F 9/4416 |
| 2019/0227828 A1* | 7/2019 | Zhang | G06F 9/4555 |
| 2020/0142683 A1* | 5/2020 | Rao | G06F 9/4411 |

OTHER PUBLICATIONS

Hewlett Packard Enterprise Development LP, "Deploying and updating Vmware vSphere on HPE ProLiant servers," Technical White Paper, May 2019, pp. 1-84, Rev. 1, Retrieved from the Internet on Aug. 20, 2019 at URL: <h20195.wwww2.hpe.com/v2/Getdocument.aspx?docname=a00061651enw>.

* cited by examiner

SELECTING AND SENDING SUBSET OF COMPONENTS TO COMPUTING DEVICE PRIOR TO OPERATING SYSTEM INSTALL

CROSS REFERENCE TO RELATED APPLICATION

This is a continuation of U.S. application Ser. No. 16/392,310, filed Apr. 23, 2019, U.S. Pat. No. 11,334,337.

BACKGROUND

Computing systems utilize various software components. For example, low level firmware to interface with the hardware and drivers for hardware that may interface with an operating system. In some cases, it may be necessary to update the firmware or drivers on a computing system. For example, updates may provide additional capabilities. As another example, updates may correct errors, often referred to as bugs, in previous versions of the firmware or drivers.

BRIEF DESCRIPTION OF THE DRAWINGS

The following detailed description references the drawings, wherein.

Figure 1:
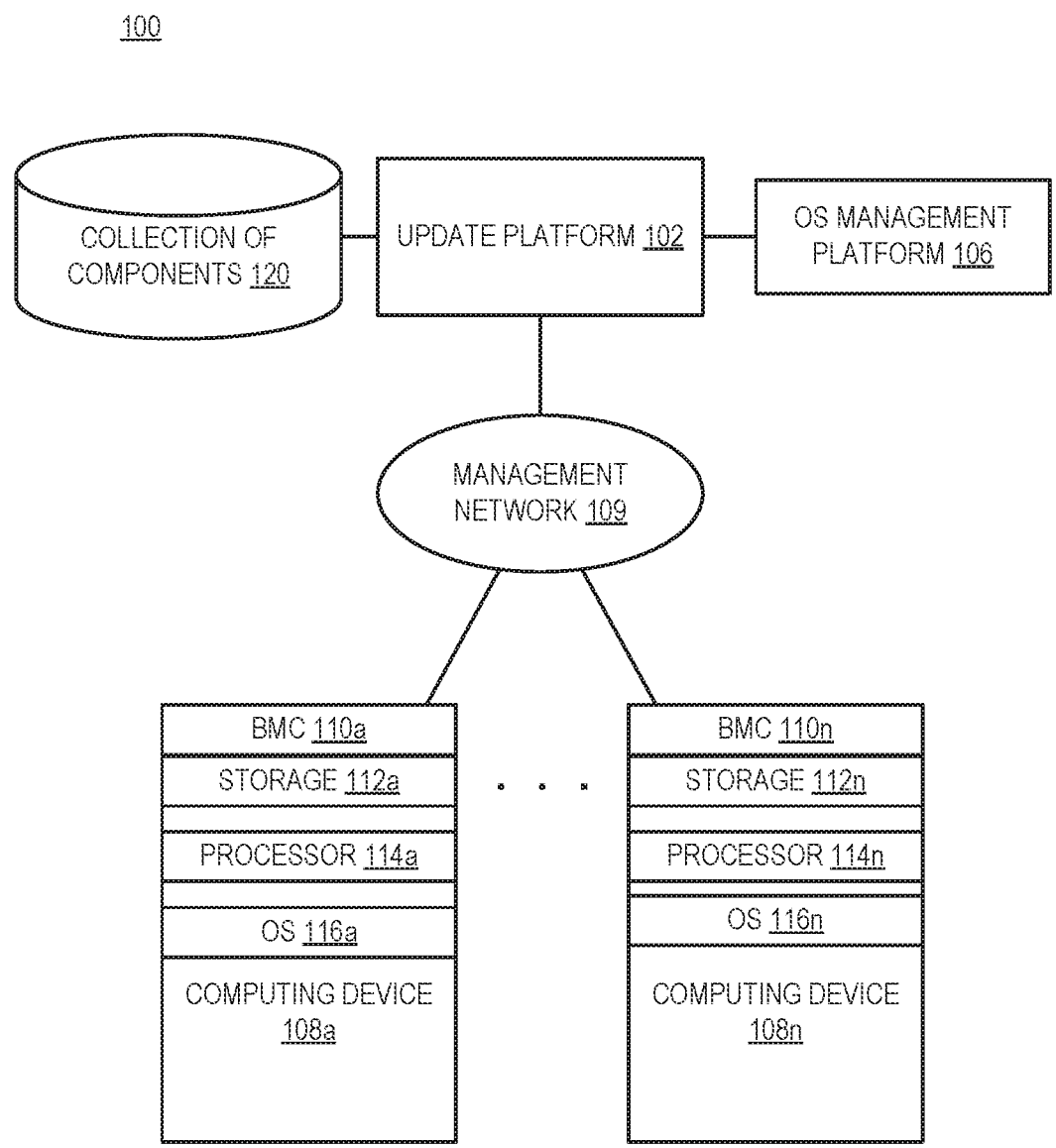
FIG. 1 is a block diagram of a system including an update platform that is capable to provide customized component install set for an operating system to a baseboard management controller of a computing device prior to installation of the operating system, according to an example.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Computing devices, such as servers, in a datacenter or other location may have one or multiple operating systems installed. Installing or updating an operating system (OS) may involve logging into an OS of a computing system, using an account credential that grants administrator privileges. The administrator, often referred to as the root user, or superuser, is granted privileges on the computer system that may exceed those that are available to a general user account. For example, execution of certain programs on the system may be limited to users that have administrator privileges. Included in those privileges may be the authority to perform updates on the firmware and/or drivers or to make configuration changes on the computer system. For purposes of this description, administrator credentials or operating system administrator credentials, refers to the credentials needed to log into a computer system as an administrator, and thus be granted administrator privileges.

A user logged in as an administrator may then download any software used in updating the firmware and/or drivers. This downloaded data may be referred to as an update package, as it may include the data used to perform the firmware and/or driver update. This data may include an executable program that actually performs the update. The update package may be downloaded to the server computer over a network. The administrator user may then update the desired components or perform configuration updates on the computer. For the remainder of this disclosure, the term update or updating refers to updating of firmware and/or drivers, as well as altering the configuration of a server computer.

Several issues may arise when using the process described above. One issue that arises is that often times the updating of the system may interfere with normal operation of the system. For example, performing an update may reduce the responsiveness of the system. In some cases, the update process may require that the system be restarted. These operations may impact the workloads that are being processed by the server. For example, in the cases where the server is restarted, that server is no longer available during the restart period.

As used herein, a "live server" is a computing system providing a service where the service is being provided. As used herein, a "maintenance window" is the time that a live server is taken down to perform maintenance activity (e.g., an upgrade of an OS, upgrade of a drivers, upgrade of firmware on a system, etc.).

When installing an OS, the OS upgrade package may not have an image of drivers customized for a particular type of machine (e.g., the processor, the bus adapter cards, etc.). A separate "software component package" may be separately downloaded to the computing device to be upgraded. However, as noted, the traditional approach is to update the OS and then download the drivers needed for that particular OS. This can lead to additional downtime and be implemented at a second maintenance window. Further, in some examples, a production network used to provide services that may be used for downloading the OS upgrade package and/or the "software component package." This can be the same network that is used to provide services by a live server. As such, downloading via this network can take some of the bandwidth that the server uses to process server workload. Moreover, the size of every permutation of each computing device hardware set and supported operating systems can be large. Accordingly, a customized subset of a larger supported software component set may be desirable.

Various embodiments described herein relate to a mechanism where an update platform can provide a software component package customized for a computing device to that computing device via management network using a baseboard management controller of the computing device. The software component package can be sent prior to installation of a new operating system and even before the new operating system is provided to the computing device.

An operating system management platform can be used to manage operating systems on a number of computing devices including the computing device to install a new OS on. The OS management platform can determine that a new OS should be installed on a particular computing device. This can be based on a user input, based on a predetermined plan or schedule, or be based on a workload management algorithm. Using a workload management algorithm can be useful, for example, when there are changes in usage of the datacenter that the computing devices are contained within.

The OS management platform can send information to an update platform that has access to a management network that baseboard management controllers (BMCs) associated with the computing devices have access to. The update platform can learn from the OS management platform that the new OS install is scheduled or is going to be scheduled. The OS management platform can provide details about the OS. The details may include, for example, a name and/or version number of the OS and the selected computing device.

The update platform can learn from the computing device what hardware components are present on the computing device via the management network and BMC. The update platform can then select software components for the computing device based on the OS to be installed and the hardware present on the particular computing device. In some examples, the hardware components can be determined after the determination that the OS is going to be installed and in response to the determination to install the OS. In other examples, the hardware components can be determined by the update platform querying the BMC of the particular computing device prior to the determination to install the OS.

The update platform can include a repository that includes a collection of software components that may be used with the computing devices and OSes. In some examples, the update platform can include a data structure that associates each component to one or multiple hardware device and/or one or multiple OSes. The update platform can take the information received about the OS that is to be installed on the computing device and filter the software components to a subset of the software components that are associated with the OS. The update platform can also filter the software components based on the hardware components present on the computing device. Similarly, the update platform can filter based on both to determine a subset of the software components applicable to both the OS to be installed and the computing device.

The subset of software components can then be sent to the BMC of the computing device. In one example, the update platform can push the subset of software components to the BMC. The BMC can store the subset of software components in a local repository. That storage can be, for example, on a flash storage incorporated within the BMC or accessible via a bus. The local repository may also be accessible to an operating system once the operating system is installed. After the software component subset has been transferred to the repository, the OS can be sent and installed. Various approaches can be used for the OS install. For example, the OS management platform may cause download through a production network and install an OS install package, the OS install package may be downloaded to the computing device via the BMC as with the software component subset, etc.

The OS install package can be executed to install the OS image on the computing device. The OS can be restarted, if necessary to complete installation. Further, after the installation is complete, the subset of the software components can be installed, In one example, the repository that the subset of software components resides can be exposed by the BMC to the OS. The OS, thus has access to the subset of software components. In one example, a script can be executed to install the software components. The script can be part of the subset of software components.

In some examples, the OS image that is installed can be pre-configured to be able to access the repository, for example, using a known driver for the ecosystem. In some examples, one or more of the software components are executable to install themselves. In other examples, scripts or other software can be executed by the OS to install one or more of the software components. Examples of software components can include drivers. In some examples, firmware can also be included in the software components. In some examples, the BMC or other firmware executable on the computing device can install the update. Because the software component subset is already present, there is no need to separately download the software components. Further, because the applicable subset is already determined for the new OS before the new OS is even installed, bandwidth is not taken to send all of the collection of components to the computing device.

As used herein, an "operating system install" is a determination to install a new or upgraded operating system onto a computing device. As used herein, an "operating system install package" is a file or set of files that can be used to install an operating system onto a computing device. An operating system install can occur on a computing device that already has an OS present or can occur on a computing device without an installed high level operating system.

As used herein, a "software component" is a set of instructions, code, etc. that can be installed to be executed by a processor on a computing device. Examples of software components include firmware that can be executed by microcontrollers or a central processing unit, drivers to communicate between an operating system and hardware of a computing device, and other software that can execute such as middleware, management software, etc. As used herein, an "Operating System" is a set of software of a computing device that manages computer hardware and software resources and provides common services for computer programs such as scheduling tasks, executing applications, controlling peripherals, etc. Examples of OSes include LINUX, WINDOWS, hypervisors, etc. A hypervisor or virtual machine monitor is computer software, firmware and/or hardware that creates and runs virtual machines. A hypervisor can present a virtual operating platform to guest virtual machines.

FIG. 1 is a block diagram of a system including an update platform that is capable to provide customized component install set for an operating system to a baseboard management controller of a computing device prior to installation of the operating system, according to an example. The system 100 can include an update platform 102 that communicates with computing devices 108a-108n via a management network 109. The update platform 102 can have access to a collection of components 120. Moreover, the update platform can be communicatively coupled to an OS management platform 106. In certain examples, the update platform 102, OS management platform 106, computing devices 108 can be implemented using one or more of computing devices, such as servers, client computers, desktop computers, mobile computers, etc. The computing devices can be implemented via a processing element, memory, and/or other components. In some examples, platforms may be run in one or more virtual machines executing on a computing device.

As noted above, a user or administrator of a datacenter may wish to install or update operating systems on one or more computing devices 108a-108n. While doing this, a set of software components may be used to on the respective computing device 108. The update platform 102 can have access to a collection of components 120. In some examples, the collection of components 120 is stored as part of the update platform 102, on the same computing device, or is accessible via a storage to the update platform 102.

The collection of components 120 can include, firmware and/or settings for one or more hardware components present on the computing devices. Further, the collection of components 120 can include drivers that can be installed on an operating system installed on the devices. In some examples, other software, such as middleware to can be included in the collection of components 120. The collection of components 120 can include a superset of supported software components for multiple of the computing devices. This can be, for example, a package of components that would be included in a service pack from a manufacturer of the computing devices. As such, multiple hardware sets can be supported. As used herein, a "hardware set" includes physical hardware (e.g., peripheral devices, microcontrollers, processors, memory, etc.) that may be included on a device. In some examples, a supported hardware set is a set for which a software component is available to be installed via the collection of components 120. Further, some components can be specific for particular operating systems (e.g., drivers for operating a particular hardware component for a particular OS). Hardware devices may include input output devices, peripheral devices connected via a bus such has a peripheral component interconnect (PCI), controllers to control busses, specific purpose hardware, etc. Multiple operating systems can include different versions of a same operating system type, operating systems of similar manufacturers, but with different configurations, operating systems from different manufacturers, or the like. As noted above, the OS may be a hypervisor.

In some examples, each software component can be associated with information regarding the particular software components relevance to a particular operating system and/or hardware component. The information can be in the form of information in a table or linked list, one or multiple tags, metadata, other data structure used to keep the information, etc. The collection of components 120 can be a large amount of information and it could take up much bandwidth on the management network 109 or other network to transfer the entire collection to each computing device 108.

Each computing device 108 can include a BMC 110a-110n. In some examples, the BMC 110 can be used to implement services for the computing device 108. BMC 110 can be implemented using a separate processor from the processor 114a-114n that is used to execute a high level operating system (e.g., OS 116a-116n). BMCs can provide so-called "lights-out" functionality for computing devices. The lights out functionality may allow a user, such as a systems administrator, to perform management operations on the computing device 108 even if an operating system is not installed or not functional on the computing device.

Moreover, in one example, the BMC 110 can run on auxiliary power, thus the computing device 108 need not be powered on to an on state where control of the computing device 108 is handed over to an operating system after boot. As examples, the BMC 110 may provide so-called "out-of-band" services, such as remote console access, remote reboot and power management functionality, monitoring health of the system, access to system logs, and the like. As used herein, a BMC 110 has management capabilities for sub-systems of a computing device 108, and is separate from a processor or processing element that executes a main operating system of a computing device (e.g., a server or set of servers).

The BMC 110 may comprise an interface, such as a network interface, and/or serial interface that an administrator can use to remotely communicate with the BMC 110. As used herein, an "out-of-band" service is a service provided by the BMC 110 via a dedicated management channel (e.g., the network interface or serial interface) and is available whether the computing device 108 is in powered on state. In some examples, a BMC 110 may be included as part of an enclosure. In other examples, a BMC 110 may be included in one or more of the servers (e.g., as part of the management subsystem of the server) or connected via an interface (e.g., a peripheral interface). In some examples, sensors associated with the BMC 110 can measure internal physical variables such as humidity, temperature, power supply voltage, communications parameters, fan speeds, operating system functions, or the like. The BMC 110 may also be capable to reboot or power cycle the device. As noted, the BMC 110 allows for remote management of the device, as such, notifications can be made to a centralized station such as the update platform 102 or a management platform using the BMC 110 and passwords or other user entry can be implemented via the BMC 110.

The BMC 110a-110n can have a storage 112a-112n coupled to the BMC 110a-110n. The storage 112 can be, for example, on a flash storage incorporated within the BMC 110 or accessible via a bus. The storage 112 can act as a local repository that may also be accessible to an operating system once the operating system is installed.

Further, the computing device may include a plurality of hardware devices or components. Examples, of hardware components include controllers, add on cards, peripherals, field programmable gate arrays (FPGAs), complex programmable logic devices (CPLDs), application specific integrated circuits (ASICs), system on chips, etc. In some examples, one or more of the hardware components can be inventoried or communicatively coupled to the BMC 110, either directly or via intermediary components. For example, the BMC 110 may request that another firmware (e.g., a basic input output system) take an inventory of one or more components if the BMC 110 is incapable of direct communications. The BMC 110 can provide the hardware devices that are present on a particular computing device 108 to the update platform 102. This can occur on request, periodically, etc.

The OS management platform 106 can determine to cause installation of an operating system on a computing device 108. The OS management platform 106 can make the determination various ways, one example way is to determine that a system with a particular OS is needed to provide a particular service based on a load balancing algorithm for the datacenter. Another example is a user configuration. A further example is based on a request. The OS management platform 106 can determine how the OS management platform 106 wants the computing device 108 to be configured and create a request for the update platform 102.

The update platform 102 is to expose an application programming interface (API) to the OS management platform 106. In some examples, the OS management platform 106 can be implemented as a virtual machine management system. In some examples, the API can be configured to work with more than one OS management platform can be management system agnostic. The request can include an identification to use the collection of components 120, which operating system to install, etc. The request can also identify the particular computing device 108. The request can be consider information associated with an operating system install.

In response to receiving the request, the update platform 102 determines that an operating system install is to occur on the computing device 108. The update platform 102 can take the information and determine a set of the supported OS, drivers, and firmware. In one example, the update platform 102 uses the information to select a subset of the collection of components 120 that are relevant for the identified OS. In one example, the potential components can be filtered by the identified OS. Further, as noted above, the BMC 110 can provide hardware device information about the hardware devices present on the identified computing device 108. The collection of components 120 can further be filtered based on hardware devices present to create a subset of the collection of components.

The subset can then be sent to the BMC 110 to be stored on its storage 112. In one example, the update platform 102 can push the subset down to the BMC 110. The subset can be in the form of a package or individual files. The package and/or individual files can be self-executable or executed via a different method. In some examples, the update platform 102 can push the subset to the storage 112 prior to the operating system to be installed is installed using an operating system install package. The update platform 102 can push the subset to the storage 112 while the computing device is acting as a live server. The live server can be implemented using an old operating system prior to install of the new OS. In another example, the server may not be executing an operating system. The pushing of the subset to the BMC 110 can be considered staging.

The operating system install package can also be sent to the computing device 108. In one example, the update platform 102 or a management platform sends the operating system install package to the computing device via the BMC 110. In another example, the operating system install package can be sent via other means, for example, via a production network or a secondary management network that the OS management platform 106 can directly communicate with one or more of the computing devices 108 with. In some examples, the computing device 108 receives the subset of components before receiving the OS install package.

The processor 114 can execute instruction to install the operating system install package. In some examples, the OS can access the storage 112 after being installed. In some examples, the OS is installed with a driver or other software that is capable of accessing the storage 112. Implementation can be performed using an infrastructure automation tool such as Chef. Chef is a tool designed for automation at scale using Ruby. In some examples, the OS can be configured to install the subset on the storage 112. The install could be as part of a periodic routine to check if anything new is on the storage and, if so, check credentials and install if appropriate. The install could also be as part of an install procedure for the OS. In some examples, for a live server, the install of the operating system and the subset can be within a single maintenance window.

In some examples, all of the subset is not installed. This can happen, for example, if the associated driver or firmware has more than one component. In some examples, the BMC 110 can install or cause updates for firmware for hardware devices separate from the installation of drivers via the OS. In some examples, some of the associated software components are installed via the OS (e.g., middleware, drivers, etc.). As noted, these can be selected for the particular OS installed as well as the particular hardware devices identified by the BMC 110 to be on the computing device.

The management network 109 can be a communication network that can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANS), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, computing devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

In some examples, the BMCs 110 can communicate with each other and/or the update platform 102 via the management network 109. In these examples, the BMCs 110 can be coupled to network interface cards (NICs) that can connect to the management network 109.

For various purposes, for example, security, the management network 109 can be isolated from a production network that the OSes 116 installed on the computing devices 108 provide services through and/or can be accessed directly through. The production network can use a separate communication network. In some examples, isolation can be implemented via virtual networks. In other examples, isolation can be implemented via using separate hardware (e.g., network switches).

In one example, the OS management platform can perform a precheck on the OS and software component set to be installed. As noted, the OS management platform 106 can create a request for a particular OS to be installed on an identified computing device to the update platform 102. The update platform 102 can read the metadata for the collection of components 120 can determine a supported OS, associated drivers, and associated firmware. The set can be identified via an identifier. The identifier can be used to identify a premade or predetermined subset package that can be used. The information can be sent back to the OS management platform 106.

The OS management platform 106 can then request that the update platform call the particular subset package using the identifier to set this as the package to be used with the particular computing device to install the new OS on. A precheck can then be called by the OS management platform 106 for the identifier. In one example, during the precheck stage, the update platform 102 reads a firmware inventory from a BMC 110 associated with the computing device 110.

In some examples, if there is a current OS 116 on the computing device 110, some of the information is received via an agent on the OS 116.

Then, the update platform 102 identifies and/or creates the install set. The update is then staged by pushing the install set to the storage 112 via the BMC 110. Once the new OS is updated, the OS management platform 106 can call a routine to apply the install set. This can be, for example, via a setting in the new OS that is installed.

Figure 2:
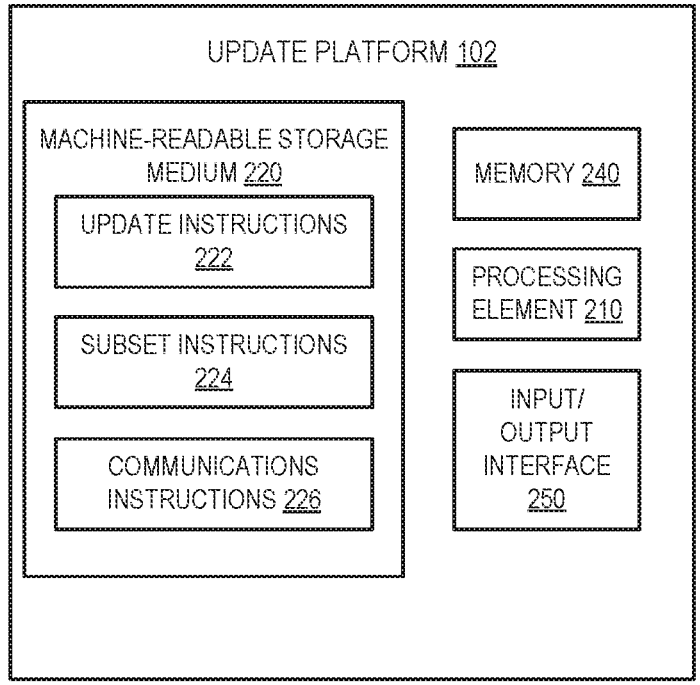
FIG. 2 is a block diagram of an update platform capable to determine and send a subset of software components customized for an operating system to a baseboard management controller of a computing device prior to installation of the operating system, according to an example.
Figure 3:
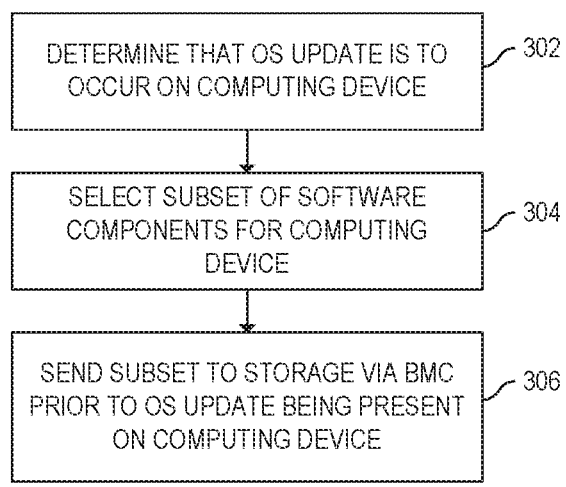
FIG. 3 is a flowchart of a method for sending a subset of software components customized for an operating system to a baseboard management controller of a computing device prior to installation of the operating system, according to an example.

FIG. 2 is a block diagram of an update platform capable to determine and send a subset of software components customized for an operating system to a baseboard management controller of a computing device prior to installation of the operating system, according to an example. FIG. 3 is a flowchart of a method for sending a subset of software components customized for an operating system to a baseboard management controller of a computing device prior to installation of the operating system, according to an example.

The update platform 102 includes, for example, a processing element 210, and a machine-readable storage medium 220 including instructions 222, 224, 226 for providing a customized set of software components to a computing device via a BMC. In some examples, the update platform 102 may be implemented, for example, as a virtual machine executing on a computing device. In some example, the update platform 102 includes the software described to implement the features discussed herein in addition to hardware used for execution of the software.

Processing element 210 may be, one or multiple central processing unit (CPU), one or multiple semiconductor-based microprocessor, one or multiple graphics processing unit (GPU), other hardware devices suitable for retrieval and execution of instructions stored in machine-readable storage medium 220, or combinations thereof. The processing element 110 can be a physical device. Moreover, in one example, the processing element 210 may include multiple cores on a chip, include multiple cores across multiple chips, multiple cores across multiple devices (e.g., if the computing device 200 includes multiple node devices), or combinations thereof. Processing element 210 may fetch, decode, and execute instructions 222, 224, 226 to implement method 300. As an alternative or in addition to retrieving and executing instructions, processing element 210 may include at least one integrated circuit (IC), other control logic, other electronic circuits, or combinations thereof that include a number of electronic components for performing the functionality of instructions 222, 224, 226.

Machine-readable storage medium 220 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), flash memory, and the like. As such, the machine-readable storage medium can be non-transitory. As described in detail herein, machine-readable storage medium 220 may be encoded with a series of executable instructions for to select a subset of software components for a computing device awaiting an operating system install and sending the subset to the computing device prior to the operating system install.

At 302, the processing element 210 can execute update instructions 222 to determine that an OS update is to occur on a computing device. As noted above, the update platform can expose an API to an OS management platform (e.g., a virtual machine management system). The OS management platform can use the API to inform the update platform 102 that an OS install is to occur on the computing device by providing information about the request. The computing device can be identified along with the OS in the information. In some examples, an address for a BMC of the computing device can be mapped to an identifier of the computing device. The update platform 102 may maintain such a mapping (e.g., when a new computing device is added to a management network to be supported by the update platform, information about that device can be collected).

At 304, the information that is collected can be used by the update platform to select a subset of software components for the computing device by executing subset instructions 224. A set of the software components can be filtered using the OS to be installed on the computing device. Further, the software components can be filtered using the hardware present on the computing device. As noted above, the BMC can provide information about what hardware is present on the computing device to the update platform 102. The software components can include, for example, firmware, drivers, etc.

At 306, communications instructions 226 can be executed to send the subset of software components that were selected for the computing device to a BMC of the computing device via a management network. An input/output interface 250 (e.g., a network interface card) can be used for the transmission. In some examples, the sending can be scheduled. Further, the update platform 102 may have credentials to push the subset to the storage associated with the BMC. The update platform 102 can send the computing device the set prior to the installation of an OS install package on the computing device.

Figure 4:
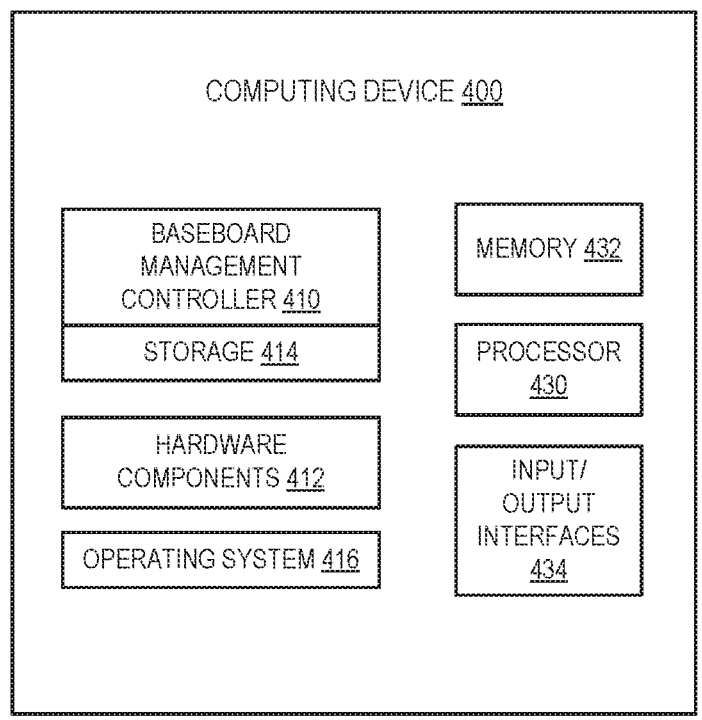
FIG. 4 is a block diagram of a computing device with a baseboard management controller capable of storing software components to install customized for an operating system prior to installation of that operating system.
Figure 5:
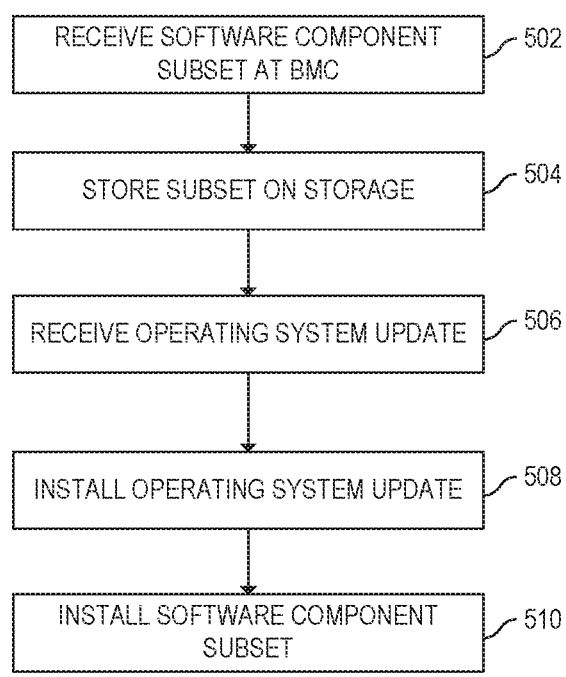
FIG. 5 is a flowchart of a method for receiving a customized software component subset at a baseboard management controller of a computing device customized for an operating system not yet installed on the computing device.

FIG. 4 is a block diagram of a computing device with a baseboard management controller capable of storing software components to install customized for an operating system prior to installation of that operating system. FIG. 5 is a flowchart of a method for receiving a customized software component subset at a baseboard management controller of a computing device customized for an operating system not yet installed on the computing device.

A processor 430, such as a central processing unit (CPU) or a microprocessor suitable for retrieval and execution of instructions and/or electronic circuits can be configured to perform the functionality of various higher level modules described herein (e.g., operating system 416). In certain scenarios, instructions and/or other information, such as operating system information, identifiers, sets and subsets of information, can be included in memory 432 or other memory. Input/output interfaces 434 may additionally be provided by the computing device 400. For example, input devices, such as a keyboard, a sensor, a touch interface, a mouse, a microphone, etc, can be utilized to receive input from an environment surrounding the computing device. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 434. In some examples, the BMC 410 can include an input/output interface such as a NIC.

One or more of the hardware devices included in the computing device 400 can include electronic circuitry for implementing the functionality described herein. In addition or as an alternative, some components may be implemented as a series of instructions encoded on a machine-readable storage medium of computing device 400 and executable by processor 430. It should be noted that, in some examples, some modules are implemented as hardware devices, while other modules are implemented as executable instructions.

In one example, the BMC 410 can run on auxiliary power, thus the computing device 400 need not be powered on to an on state where control of the computing device 400 is handed over to an operating system after boot. As examples, the BMC 410 may provide so-called "out-of-band" services, such as remote console access, remote reboot and power management functionality, monitoring health of the system, access to system logs, and the like. As used herein, a BMC 410 has management capabilities for sub-systems of a computing device 400, and is separate from a processor or processing element that executes a main operating system of a computing device (e.g., a server or set of servers).

The BMC 410 may comprise an interface, such as a network interface, and/or serial interface that an administrator can use to remotely communicate with the BMC 410. As used herein, an "out-of-band" service is a service provided by the BMC 410 via a dedicated management channel (e.g., the network interface or serial interface) and is available whether the computing device 400 is in powered on state. In some examples, a BMC 410 may be included as part of an enclosure. In other examples, a BMC 410 may be included in one or more of the servers (e.g., as part of the management subsystem of the server) or connected via an interface (e.g., a peripheral interface). In some examples, sensors associated with the BMC 410 can measure internal physical variables such as humidity, temperature, power supply voltage, communications parameters, fan speeds, operating system functions, or the like. The BMC 410 may also be capable to reboot or power cycle the device. As noted, the BMC 410 allows for remote management of the device, as such, notifications can be made to a centralized station such as the update platform or a management platform using the BMC 410 and passwords or other user entry can be implemented via the BMC 410.

The BMC 410 can have a storage 414 coupled to the BMC 410. The storage 414 can be, for example, on a flash storage incorporated within the BMC 410 or accessible via a bus. The storage 414 can act as a local repository that may also be accessible to an operating system once the operating system is installed.

The computing device 400 can include hardware components 412. Examples of hardware components include microcontrollers, controller hubs, a southbridge, a northbridge, peripheral devices coupled to one or more bus, daughter boards, graphics cards, ASICs, etc. One or more of the hardware devices may be associated with firmware engines. Some of these firmware engines can be updated with firmware.

A firmware engine can be implemented using instructions executable by a processor and/or logic. In some examples, the firmware engine can be implemented as platform firmware. Platform firmware may include an interface such as a basic input/output system (BIOS) or unified extensible firmware interface (UEFI) to allow it to be interfaced with. The platform firmware can be located at an address space where the processor 430 (e.g., CPU) for the computing device 400 boots. In some examples, the platform firmware may be responsible for a power on self-test for the computing device 400. In other examples, the platform firmware can be responsible for the boot process and what, if any, operating system to load onto the computing device 400. Further, the platform firmware may be capable to initialize various components of the computing device 400 such as peripherals, memory devices 432, memory controller settings, storage controller settings, bus speeds, video card information, etc. In some examples, platform firmware can also be capable to perform various low level functionality while the computing device 400 executes. Moreover, in some examples, platform firmware may be capable to communicate with a higher level operating system executing on a CPU, for example via an advanced configuration and power interface (ACPI).

In some examples, BMC 410 can take an inventory of the hardware components 412 present on the computing device 400 as explained in detail above. The inventory can be sent to the update platform. The update platform can be implemented to use the inventory and an operating system install information set to determine a subset of software components to send to the computing device as described in method 300.

At 502, the BMC 410 can receive the software component subset from the update platform. As noted above, in one example, the update platform can push the information down to the BMC 410. As used herein, to push information means that the update platform initiates the transaction to provide the BMC 410 the software component subset (e.g., in response to determining that the operating system is to be installed on the computing device). In some examples, the software component subset is received while the computing device is acting as a live server. This can be accomplished without affecting the live server because the BMC 410 is separate subsystem from an OS 416 of the live server executing on processor 430.

At 504, the BMC 410 can cause the received software component subset to be stored on a storage 414. The BMC 410 can receive information and then store the information in the storage 414 directly or store in a buffer memory and then store the information in the storage 414. As noted above, the computing device 400 can be configured such that an OS 416 with proper configuration (e.g., drivers) can access the storage 414.

At 506, the computing device 400 can receive an operating system update package associated with the operating system install. In one example, the OS update package can be received after the subset. In some examples, the operating system update package is received via a network separate than a management network associated with the BMC. In other examples, the OS update package is received via the management network. The OS update package can be stored in a location accessible to an instruction set executed by the processor 430, for example, a location that is capable to boot the OS update package. In another example, the OS update package can be executable by an already running OS 416 on the computing device 400, which can facilitate install of the new OS.

At 508, the processor 430 can install the new OS using the OS update package. As noted, the execution can be initiated via an OS currently installed on the computing device 400 or via a startup routine. Further, in some examples, the update can be scheduled. In one example, while an existing OS 416 is acting as a live server, an OS management platform 106 can schedule a maintenance window where virtual machines and/or processes running on the computing device are transferred off of the computing device or stopped and additional virtual machines and/or processes are not started. Once this is complete, the computing device can be brought down for the installation of the new OS.

At 510, the software component subset can be installed. In some examples, the software components can include drivers. These drivers can be installed after the new OS is installed. In some examples, because there is no need to separately download the subset, the installation of the drivers in the subset can occur in the same maintenance window as the installation of the OS. As noted above, the subset can include drivers that are identified to work with the OS type. In another example, the BMC 410 can be configured to update or cause update of one or more firmware engines associated with the hardware components 412 that are supported by the received subset.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A system comprising:
    a processor; and
    a non-transitory storage medium storing instructions executable on the processor to:
        determine that an installation of an operating system is to occur on a computing device coupled to the system over a network;
        access a repository including a plurality of software components for multiple operating systems and multiple hardware sets;
        based on the determination that the installation of the operating system is to occur on the computing device, query, over the network, a baseboard management controller (BMC) of the computing device for information of a plurality of hardware devices in the computing device;
        receive, at the system over the network from the BMC responsive to the querying, the information of the plurality of hardware devices identified by a hardware inventory performed by the BMC;
        filter the plurality of software components in the repository to select a subset of the plurality of software components for the computing device based on an operating system type of the operating system and the plurality of hardware devices identified by the hardware inventory performed by the BMC; and
        send, from the system over the network, the subset of the plurality of software components to the BMC prior to the installation of the operating system using an operating system install package, the sending of the subset of the plurality of software components to cause an installation by the computing device of the operating system from the operating system install package after the subset of the plurality of software components has arrived at the computing device.

2. The system of claim 1, wherein the instructions are executable on the processor to send the subset of the plurality of software components to the BMC while the computing device is acting as a live server.

3. The system of claim 1, wherein the sending of the subset of the plurality of software components is to cause an installation by the computing device of the subset of the plurality of software components retrieved from a storage of the BMC after a completion of the installation of the operating system using the operating system install package.

4. The system of claim 1, wherein the instructions are executable on the processor to send, from the system, the operating system install package to the computing device after the sending of the subset of the plurality of software components from the system to the BMC.

5. The system of claim 1, wherein the installation of the operating system and the installation of the subset of the plurality of software components occur in a single maintenance window.

6. The system of claim 1, wherein the operating system type is one of a plurality of different operating system types, and wherein different subsets of the plurality of software components correspond to the different operating system types.

7. The system of claim 6, wherein the system is to expose an application programming interface (API) to an operating system management platform, and wherein the instructions are executable on the processor to:
    receive information about the installation of the operating system from the operating system management platform via the API; and
    use the information about the installation of the operating system to select the subset of the plurality of software components.

8. The system of claim 7, wherein the API is to translate requests from multiple operating system management platforms including the operating system management platform to requests for custom subsets of the plurality of software components including the subset, and wherein the operating system management platform is a virtual machine management system.

9. The system of claim 6, wherein the subset of the plurality of software components includes drivers for the plurality of hardware devices, wherein the drivers are specific for the operating system type of the operating system in the operating system install package.

10. A method comprising:
    determining, at an update platform comprising a hardware processor, that an installation of an operating system is to occur on a computing device coupled to the update platform over a network, wherein the computing device includes a baseboard management controller (BMC), a storage in the BMC, and a plurality of hardware devices, and wherein the update platform includes a repository including a plurality of software components for multiple operating systems and multiple hardware sets;
    based on the determination that the installation of the operating system is to occur on the computing device, querying, by the update platform over the network, the BMC of the computing device for information of the plurality of hardware devices in the computing device;
    receiving, at the update platform over the network from the BMC based on the querying, the information of the plurality of hardware devices identified by a hardware inventory performed by the BMC;
    selecting, by the update platform, a subset of the plurality of software components in the repository for the computing device by filtering the plurality of software components based on an operating system type of the operating system and the plurality of hardware devices identified by the hardware inventory of the computing device performed by the BMC; and sending, by the update platform over the network, the subset of the plurality of software components to the storage in the BMC prior to an operating system install package for the installation of the operating system being present on the computing device, the sending of the subset of the plurality of software components to cause an installation by the computing device of the operating system from the operating system install package after the subset of the plurality of software components has arrived at the computing device.

11. The method of claim 10, comprising:

sending, from the update platform, the operating system install package to the computing device after the update platform sends the subset of the plurality of software components to the storage in the BMC.

12. The method of claim 10, further comprising:

receiving, by the computing device, the operating system install package after the subset of the plurality of software components has arrived at the computing device.

13. The method of claim 12, wherein the BMC is separate from a processor of the computing device, the method further comprising:

executing, by the processor, the operating system installed from the operating system install package.

14. The method of claim 13, further comprising:

accessing, by the operating system executed on the processor, the storage in the BMC to retrieve the subset of the plurality of software components; and installing, by the computing device, the subset of the plurality of software components on the computing device after retrieval of the subset of the plurality of software components from the storage in the BMC.

15. The method of claim 13, wherein the BMC is run on auxiliary power and is able perform operations of the BMC while the computing device is powered off.

16. The method of claim 10, wherein the operating system type is one of a plurality of different operating system types, and wherein different subsets of the plurality of software components correspond to the different operating system types.

17. The method of claim 10, comprising:

exposing, by the update platform, an application programming interface (API) to a virtual machine management system;

receiving, at the update platform, information about the installation of the operating system from the virtual machine management system via the API; and using, by the update platform, the information about the installation of the operating system to select the subset of the plurality of software components.

18. A non-transitory machine-readable storage medium storing instructions that upon execution cause a system to:

determine that an installation of an operating system is to occur on a computing device coupled to the system over a network, wherein the computing device includes a baseboard management controller (BMC), a storage in the BMC, and a plurality of hardware devices;

access a repository including a plurality of software components for multiple operating systems and multiple hardware sets;

based on the determination that the installation of the operating system is to occur on the computing device, query, over the network, the BMC of the computing device for information of the plurality of hardware devices in the computing device;

receive, at the system over the network from the BMC responsive to the querying, the information of the plurality of hardware devices identified by a hardware inventory performed by the BMC;

filter the plurality of software components in the repository to select a subset of the plurality of software components for the computing device based on an operating system type of the operating system and the plurality of hardware devices identified by the hardware inventory performed by the BMC of the computing device; and send, from the system over the network, the subset of the plurality of software components to the storage in the BMC prior to the installation of the operating system using an operating system install package, the sending of the subset of the plurality of software components to cause an installation by the computing device of the operating system from the operating system install package after the subset of the plurality of software components has arrived at the computing device.

19. The non-transitory machine-readable storage medium of claim 18, wherein the plurality of software components comprise drivers.

20. The non-transitory machine-readable storage medium of claim 18, wherein the instructions upon execution cause the system to:

expose an application programming interface (API) to a virtual machine management system receive, at the system, information about the installation of the operating system from the virtual machine management system via the API; and use the information about the installation of the operating system to select the subset of the plurality of software components.

* * * * *